(12) United States Patent
Chang

(10) Patent No.: US 9,936,504 B2
(45) Date of Patent: *Apr. 3, 2018

(54) MULTIMEDIA BROADCAST MULTICAST SERVICE (MBMS) FREQUENCY PRIORITIZATION

(71) Applicant: Kyocera Corporation, Kyoto (JP)

(72) Inventor: Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 65 days.

This patent is subject to a terminal disclaimer.

(21) Appl. No.: 15/134,023

(22) Filed: Apr. 20, 2016

(65) Prior Publication Data

US 2016/0234846 A1 Aug. 11, 2016

Related U.S. Application Data

(63) Continuation of application No. 13/781,435, filed on Feb. 28, 2013, now Pat. No. 9,332,400.

(60) Provisional application No. 61/611,893, filed on Mar. 16, 2012.

(51) Int. Cl.
*H04L 1/00* (2006.01)
*H04W 72/04* (2009.01)
*H04W 4/06* (2009.01)
*H04W 76/04* (2009.01)

(52) U.S. Cl.
CPC ......... *H04W 72/0453* (2013.01); *H04W 4/06* (2013.01); *H04W 76/046* (2013.01)

(58) Field of Classification Search
CPC ...................................................... H04W 4/06
USPC ....................................................... 370/235
See application file for complete search history.

(56) References Cited

U.S. PATENT DOCUMENTS

| | | |
|---|---|---|
| 2006/0146858 A1 | 7/2006 | Kim |
| 2008/0112352 A1 | 5/2008 | Kuo |
| 2010/0222055 A1 | 9/2010 | Cho et al. |
| 2012/0220324 A1 | 8/2012 | Sambhwani et al. |
| 2012/0236776 A1 | 9/2012 | Zhang et al. |
| 2013/0195003 A1 | 8/2013 | Lee et al. |

*Primary Examiner* — Shripal Khajuria

(57) ABSTRACT

An indicator indicates whether Multimedia Broadcast Multicast Service (MBMS) Service Area Identifier (SAI) frequency information broadcast from a wireless communication network to a wireless communication device is being updated dynamically. Based on the indicator, the wireless communication device may apply different procedures for acquiring an MBMS service.

22 Claims, 7 Drawing Sheets

MULTIMEDIA BROADCAST MULTICAST SERVICE (MBMS) FREQUENCY PRIORITIZATION

RELATED APPLICATIONS

This application claims the benefit of priority of U.S. provisional patent application Ser. No. 61/611,893, entitled RESELECTION PRIORITY WITH MBMS ASSISTANCE INFORMATION, filed on Mar. 16, 2012; and to U.S. patent application Ser. No. 13/781,435, entitled MULTIMEDIA BROADCAST MULTICASE SERVICE (MBMS) FREQUENCY PRIORITIZATION, filed on Feb. 28, 2013; both of which are incorporated in their entirety herein.

FIELD

This invention generally relates to wireless communications and more particularly to Multimedia Broadcast Multicast Service (MBMS) frequency prioritization.

BACKGROUND

Multimedia Broadcast Multicast Service (MBMS) is a Point-to-Multipoint (PTM) interface specification designed to provide efficient delivery of broadcast and multicast services within 3rd Generation Partnership Project (3GPP) cellular networks. Examples of MBMS interface specifications include those described in Universal Mobile Telecommunications System (UMTS) and Long Term Evolution (LTE) communication specifications. For broadcast transmission across multiple cells, the specifications define transmission over single-frequency network configurations. Intended applications include mobile TV, news, radio broadcasting, file delivery, emergency alerts, and others. When services are broadcasted by MBMS, all cells inside an MBSFN (Multimedia Broadcast multicast service Single Frequency Network) area transmit the same MBMS service. Services that can be provided using PTM can be referred to as PTM compatible services. As discussed herein, MBMS services and MBMS content are PTM compatible services that are provided via MBMS.

Users access these services and obtain the MBMS content through wireless communication devices such as cellular phones, tablets, laptops, and other devices with wireless transceivers that communicate with the base stations within the communication system. The base stations, sometimes referred to as eNodeBs or eNBs, provide wireless services to the wireless communication devices, sometimes referred to as user equipment (UE) or UE devices, within cells.

A user can access at least some multimedia services through a UE using either a Point-to-Point (PTP) connection or a Point-to-Multipoint (PTM) transmission. PTP services are provided using Unicast techniques and PTP transmissions are performed using MBMS communication in 3GPP systems. Accordingly, a PTM compatible service can be provided using either Unicast service or MBMS. In order to avoid inefficient use of resources, current specifications and proposals include provisions for tracking and evaluating the number of UEs that have been characterized by the network, at least for resource management purposes, as UEs that will receive the PTM compatible service. The network monitors the number of UEs accessing an MBMS service, congestion levels and other communication parameters, and makes appropriate adjustments to the network to maintain efficient use of communication resources. For example, resources are more efficiently allocated by only providing a specific PTM compatible service with MBMS when the number of wireless communication devices in connected mode (connected mode UEs) receiving the specific PTM compatible service using PTM is sufficiently high. When there are many users that are using, or will likely use, a particular PTM compatible service in the MBSFN area, then the network allocates resources to deliver the program by MBMS via PTM. In other words, if there are many users that are interested in getting a particular PTM compatible service and, therefore, are operating a wireless communication device that is receiving, or is likely to receive, the PTM compatible service in the MBSFN area, then the network allocates resources to deliver the specific PTM compatible service using PTM techniques. On the contrary, if there are a small number of users that are interested in and will use the particular PTM compatible service, it is more efficient to deliver the PTM compatible service using PTP techniques such as those used with a Unicast connection. When services are broadcasted by PTM using MBMS, all cells inside the MBSFN (Multimedia Broadcast multicast service Single Frequency Network) area are required to broadcast the same information so the amount of wasted resource could be very large when very few wireless communication devices (UEs) are obtaining the service. In accordance with current specifications, therefore, a program or service is discontinued from PTM transmission when the size of the audience using wireless communication devices in connected mode decreases below a threshold. For activation of a service by PTM, the network evaluates the number of wireless communication devices which are PTM capable but which are receiving a given PTM compatible service via PTP such as through a Unicast service as well as devices that have been identified as devices that will receive the PTM compatible service. The network characterizes devices that are receiving the service or that are likely to receive the service as devices that will receive the service for purposes of resource management and determines the number of PTM capable wireless communication devices (UEs) that are characterized as devices that will receive the service. When that number of PTM capable wireless communication devices (UEs) exceeds a threshold, the service is provided using PTM.

In order for the network to receive reception status feedback from the wireless communication devices (UEs), the current 3GPP specifications specify Counting Procedures. A Counting Procedure is initiated by the network. A Multi-cell/multicast Coordination Entity (MCE) in the network sends a request to each eNodeB providing the specific PTM compatible service in the MBSFN area to send a Counting Request to the wireless communication devices (UEs). The Counting Request contains a list of specific PTM compatible service identifiers requiring wireless communication device (UE) feedback. The connected mode wireless communication devices (UEs) which are receiving, or interested in receiving, the identified content respond with a Counting Response message including the specific PTM compatible service identifiers that are of interest.

The current communication specifications, therefore, provide for a Counting Procedure that allows for the network to determine a number of wireless communication devices (UEs) in the connected mode that are interested in specific MBMS content. Proposals have been offered for counting wireless communication devices (UEs) in idle mode that are receiving, or will likely receive, a specific PTM compatible service.

The network also monitors the number of wireless communication devices (UEs) that are accessing a particular frequency and performs load balancing procedures to avoid congestion. For example, when a threshold percentage of total capacity is reached, the network applies procedures for reducing the number of wireless communication devices on the particular frequency.

Current 3GPP specifications specify a mechanism for providing MBMS frequency information to the wireless communication devices, where the MBMS frequency information allows a wireless communication device to determine the frequencies at which particular MBMS services are available. More specifically, the most 3GPP Revision 11 specification provides that base stations (eNBs) transmit MBMS Service Area Identification (SAI) frequency information using the System Information Block 15 (SIB15). The MBMS SAI frequency information provides information regarding the relationship between SAIs and frequencies. For example, the SAI frequency information includes the correlation between MBMS SAIs and frequency channels for all MBMS frequency channels for the serving base station (eNB) as well as for neighboring base stations (eNBs). The wireless communication also obtains a User Service Description (USD) which provides information related to the relationship between SAIs and MBMS services. For example the USD contains at least Temporary Mobile Group Identities (TMGIs) and MBMS Service Area Identities (SAIs) as well as an association between the TMGIs and the MBMS SAIs. The wireless communication device downloads the USD and may receive the USD from a base station in some circumstances. The MBMS frequency information which provides the relationship between MBMS services and frequencies can be determined based on the USD and the SAI frequency information.

Network changes result from the counting procedures, load balancing, and other network management may result in changes to the MBMS frequencies and services such that the frequencies carrying a particular MBMS service are changed. Accordingly, in some cases the network adjustments may result in changes in the frequency information related to MBMS services.

SUMMARY

An indicator indicates whether Multimedia Broadcast Multicast Service (MBMS) Service Area Identifier (SAI) frequency information broadcast from a wireless communication network to a wireless communication device is being updated dynamically. Based on the indicator, the wireless communication device may apply different procedures for acquiring an MBMS service.

DETAILED DESCRIPTION

As described above, current communication specifications and proposals include techniques for providing MBMS frequency information to wireless communication devices (UEs). In accordance with current communication specifications such as (3GPP TS 36.304 version 11.2.0) wireless communication devices (UEs) prioritize MBMS frequencies based on the frequency information. The frequency information, however, may change when adjustments to the network are made. Currently, the 3GPP specification does not require that the frequency information be dynamically updated. In other words, there is no requirement for the base stations (eNBs) to update the frequency information transmitted to the wireless communication devices even if the data has changed. As a result, it is possible that a wireless communication device will prioritize an MBMS frequency in situations where the MBMS service is no longer available at that particular frequency.

In the embodiments discussed below, however, an indicator is transmitted to the wireless communication devices indicating whether the frequency information is dynamically updated. For the examples, the indicator is either a true indicator indicating the frequency information is updated dynamically or a false indicator indicating the frequency information is not dynamically updated. A wireless communication device (UE) applies a dynamic frequency prioritization procedure when a true indicator is received and applies a non-dynamic frequency prioritization when a false indicator is received.

Figure 1:
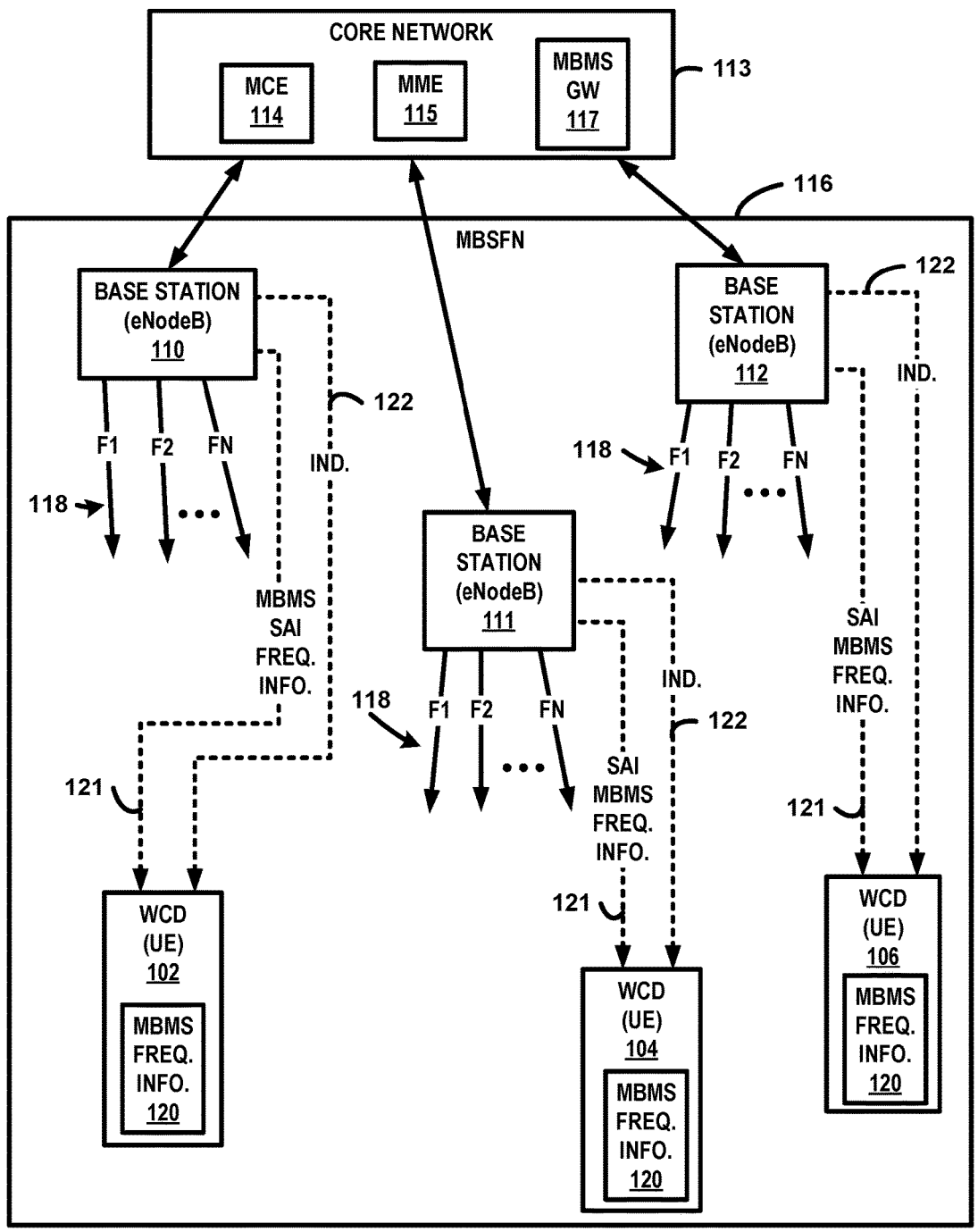
FIG. 1 is a block diagram of a communication system that is capable of providing Multimedia Broadcast Multicast Service (MBMS) to wireless communication devices.

FIG. 1 is a block diagram of a communication system 100 that is capable of providing Multimedia Broadcast Multicast Service (MBMS) to wireless communication devices 102, 104, 106. The communication system 100, therefore, is referred to as anMBMS communication system 100. The various functions and operations of the blocks described with reference to the MBMS communication system 100 may be implemented in any number of devices, circuits, or elements. Two or more of the functional blocks may be integrated in a single device and the functions described as performed in any single device may be implemented over several devices. For example, at least some of the functions of the MCE 114 may be performed by the base stations 110-112 or other entities within the core network 113. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification. A communication specification may include several revisions as modifications are adopted by the standard body. Although the examples discussed herein may be used with any number of revisions of the 3GPP LTE communication specification, the examples operate in accordance with modification of the Radio Resource Control (RRC) specification TS 36.331 version 11.2.0 Release 11.

The MBMS communication system 100 is capable of transmitting certain content to wireless communication devices (UEs) using either Unicast services or the MBMS services. The content, referred to herein as PTM compatible service and MBMS service may be a service, data, or a program that can be accessed through a wireless communication device. Examples of PTM compatible services include streaming audio and video and other multimedia data. Accordingly, as discussed herein, a PTM compatible service may be provided using PTP (Unicast) service or PTM service. For the examples, the PTM service is provided using MBMS and referred to as a MBMS service. The communication system 100 may also provide other communication services such as wireless telephone service, SMS, text messaging, and other services.

The MBMS communication system 100 includes several base stations 110-112 sometimes referred to as eNodeBs or eNBs (110-112), that communicate with the wireless communication devices (UEs) 102, 104, 106 by transmitting downlink signals and receiving uplink signals transmitted from the wireless communication devices 102, 104, 106. The wireless communication devices (UEs) 102, 104, 106 are any wireless communication devices such as mobile phones, transceiver modems, personal digital assistants (PDAs), and tablets, for example. The wireless communication devices may be referred to as cell phones, mobile devices, smart phones, and other names. In systems operating in accordance with 3rd Generation Partnership Project (3GPP) communication standards, the wireless communication devices 102, 104, 106 are often referred to as user equipment (UE), (UEs), or UE devices. Since for the examples provided herein the system operates in accordance with a 3GPP communication specification, the term eNodeB may be used to refer to the base stations and the wireless communication devices may be referred to as UEs.

The base stations (eNodeBs) 110-112 are connected to a network through a backhaul in accordance with known techniques. The MBMS communication system 100 provides PTM services by transmitting the PTM compatible service through multiple base stations (eNodeBs) 110-112 using PTM and MBMS techniques.

A Multi-cell/multicast Coordination Entity (MCE) 114 manages MBMS communications by exchanging information and instructions with the base stations (eNodeBs) 110-112. The MCE 114 is typically a logical entity that is implemented over several devices or network elements within the core network 113. The MCE 114, however, may be implemented within a single device or network element in some circumstances. The MCE 114 performs functions such as admission control and allocation of radio resources for the MBMS Single Frequency Network (MBSFN) area 116 for multicell MBMS. The core network 113 also includes a Mobility Management Entity (MME) 115. The MME is a logical entity and the control node for the LTE network. The MME 115 handles idle mode UE tracking and paging procedure including retransmissions. The MME is also involved in the bearer activation/deactivation process. In managing the MBMS communications, the MCE 114 invokes counting procedures, acquires counting results for one or more PTM compatible services, and monitors capacity and congestion of communication resources. Based on the counting procedure results, congestion evaluations, and possibly other factors, the MCE 114 determines in coordination with the eNB whether a PTM session should be suspended, established, and resumed. A MBMS session is a session where a PTM compatible service is multicast from the eNodeBs 110-112. Other than the new procedures related to managing frequency information and providing frequency information and dynamic frequency information indicators described herein, the MCE 114 operates in accordance with one or more current 3GPP specifications to perform these tasks for the examples described herein.

An MBMS Gateway (MBMS GW) 117 in the core network 113 is the entry point of incoming broadcast/multicast traffic. The MBMS GW 117 broadcasts the packets to all base stations (eNBs) within a service area and also performs MBMS session management. The core network 113 may include any combination of hardware and code for implementing the functions described here as well as the overall operation of the system 100. Accordingly, the core network 113 may include other entities and functional blocks not shown in FIG. 1, Communication resources are divided at least by frequency such that each of several downlink frequency channels 118 is independently assigned to an MBMS service or other communication service. In accordance with conventional techniques, the core network 113 determines which frequencies are to be used for transmitting the MBMS services. The core network 113 assigns one or more frequency channels for transmission of MBMS services that are to be provided by a base station. The availability of a particular MBMS service may differ between base stations depending on which frequencies are supported by each base station. For example, frequencies F1 and F2 may be used by a first base station 110, frequency F2 may be used by a second base station 111, and frequency F3 may be used by a third base station 112 to provide the same MBMS service or program.

MBMS frequency information 120 identifies the frequency channel(s) used for providing each MBMS service. Although, in some situations, the frequency information 120 may be provided in a single transmission that directly identifies the frequency channels and MBMS services, typically, the wireless communication device must apply stored program information to received SAI frequency information to determine the MBMS service to frequency relationship. In the TS 36.331 version 11.2.0 Release 11 specification, MBMS SAI frequency information 121 provides the relationship between MBMS SAIs and frequency channels for all MBMS frequency channels for the serving base station (eNB) as well as for frequencies that are operated by either the serving base station or the neighboring base stations (eNBs). Accordingly the wireless communication devices (UEs) determine the MBMS frequency information 120 from the MBMS SAI frequency information 121.

Conventional techniques and communication specifications, however, do not apply or specify requirements regarding the age of the frequency information data. As a result, the frequency information may be inaccurate due to network changes that are not reflected in the data. For example, if a particular MBMS service is no longer transmitted on a frequency in response to the latest counting procedure, transmitted frequency information may still indicate that the MBMS service is available at the particular frequency when the MBMS SAI frequency information 121 is not updated.

In accordance with embodiments of the invention, however, an indicator 122 is transmitted to the wireless communication devices (UEs) 102, 104, 106 indicating whether the MBMS SAI frequency information 121 is dynamically updated. For the examples herein, the indicator 122 indicates one of two indications including a true indication indicating that the MBMS SAI frequency information 121 is updated dynamically and a false indication indicating that the MBMS SAI frequency information 121 is not dynamically updated. As discussed herein, the MBMS SAI frequency information is considered to be dynamically updated if it is at least updated when there is a change in the frequency information. In some situations, however, "dynamically updated" may be defined as an updating rate above a threshold rate of updating. In other situations, "dynamically updated" may be defined as resetting the MBMS SAI frequency information 121 after every network change, even if the MBMS SAI frequency information 121 has not been changed since the last resetting. The indicator 122, therefore, also provides an indication of the reliability of the frequency information. A wireless communication device (UE) can interpret the frequency as being more reliable when a true indicator is received, for example. For the examples, the indicator 122 is a single bit within the SIB15. Therefore, as compared to a conventional SIB15, the SIB15 of the examples includes an additional reserved field for the indicator.

The 3GPP specifications require that the wireless communication devices (UEs) follow a strict frequency prioritization procedure. The core network provides a network prioritization list that typically includes a prioritized list of up to eight frequencies. The wireless communication devices (UEs) acquire the frequencies in the ordered priority. One exception to applying the network prioritization list occurs when a wireless communication device (UE) is accessing an MBMS service. The wireless communication device (UE) prioritizes the MBMS service frequency to attempt to access the MBMS service. When the MBMS service is no longer desired, the wireless communication device (UE) returns to following the network prioritization list.

Figure 2:
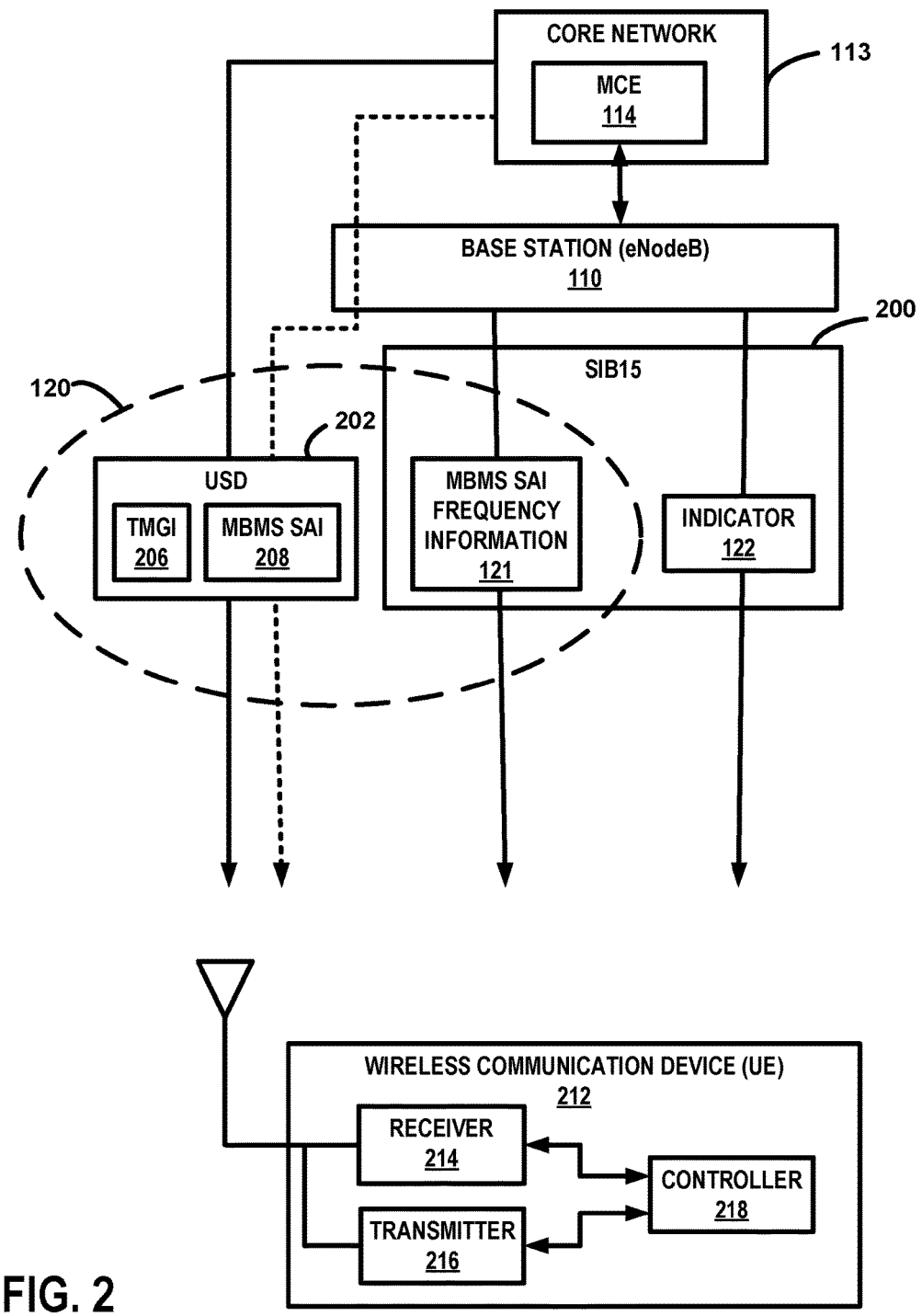
FIG. 2 is a block diagram of a base station (eNB) and wireless communication device (UE) where the base station (eNB) transmits MBMS SAI frequency information and the indicator using the System Information Block 15 (SIB15).

FIG. 2 is a block diagram of a base station (eNB) and wireless communication device (UE) where the base station (eNB) transmits MBMS SAI frequency information 121 and the indicator 122 in the System Information Block 15 (SIB15) 200. The downloaded information of a User Service Description (USD) 202 and the MBMS SAI frequency information 121 form the MBMS frequency information 120. Typically, the USD 202 is an application file that is downloaded by the wireless communication devices (UEs). In FIG. 2, the dashed line from the core network 113 through the base station 110 indicates that the USD is downloaded over a wireless link in some circumstances. The USD 202 contains at least Temporary Mobile Group Identities (TMGIs) 206 and MBMS Service Area Identities (SAIs) 208 as well as an association between the TMGIs and the MBMS SAIs. Each SAI uniquely identifies a Service Area (SA). An MBMS Service area is defined as the area within which data of a specific MBMS session are sent. Each individual MBMS session may be sent to a different MBMS Service Area. Each MBMS Service Area comprises of one or more MBMS SAIs.

Each TMGI identifies an MBMS service. Therefore, the USD 202 provides information to the wireless communication devices regarding which MBMS SAI is providing each TMGI. A particular TMGI may be provided by more than one MBMS SA. Accordingly, a TMGI may be associated with more than one MBMS SAI. The USD also includes USD MBMS frequency information (not shown) indicating the association between frequency channels and MBMS SAIs. The USD MBMS frequency information in the USD, however, may not be accurate since frequency channels are controlled by the particular network and may change over time. MBMS SAI frequency information 121 is provided by the base station by another transmission. In accordance with 3GPP TS 36.331 version 11.2.0 Release 11, the MBMS SAI frequency information 121 is transmitted in the System Information Block 15 (SIB15) 200 and includes the correlation between MBMS SAIs and frequency channels for all MBMS frequency channels for the serving base station (eNB) as well as for frequencies that is operated by either the serving base station or the neighboring base stations (eNBs). For the examples discussed herein, the SIB15 is formatted and transmitted in accordance with the 3GPP TS 36.331 version 11.2.0 Release 11 except that an additional field is assigned for the indicator 122. The indicator 122 may be transmitted in other ways in some situations.

The wireless communication device (UE) 212 includes a receiver 214, transmitter 216 and a controller 218. The wireless communication device (UE) 212 of FIG. 2 is an example of the wireless communication devices 102, 104, 106 of FIG. 1. The various functions and operations of the blocks described with reference to wireless communication device 212 may be implemented in any number of devices, circuits, or elements. Two or more of the functional blocks may be integrated in a single device and the functions described as performed in any single device may be implemented over several devices. For example, at some of the functions of the controller 218 may be performed by the receiver 214 or transmitter 216.

The receiver 214 receives downlink signals transmitted from the base stations in accordance with the 3GPP communication specification. The transmitter transmits uplink signals to the base stations in accordance with the 3GPP communication specification. The controller 218 is any processor, microprocessor, processor arrangement, or computer that can execute code to perform the functions described herein and to facilitate the overall operation of the wireless communication device 212. The controller typically includes, or is connected to, a memory (not shown) which may be any combination of persistent and temporary memory suitable to store information, data and/or code. The SIB15 is transmitted over downlink signals and processed by the receiver 214 and controller 218 to extract the information related to MBMS SAI frequency information 210 and the indicator 122. In some cases, the USD 202 is downloaded through the base station 110 and received at the receiver 214 although the USD 202 may be downloaded through other means, such as through a computer that is connected to the core network 113. The controller 218 processes the USD file to determine TMGI 206 and MBMS SAI 208. Accordingly, the MBMS frequency information 120 and the indicator 122 are received at the controller 218.

The controller 218 evaluates the indicator to determine whether the MBMS SAI frequency information 121 is dynamically updated. When there is need for the wireless communication device to access a MBMS frequency channel, the controller 218 performs the procedure for reselecting a frequency listed in the MBMS frequency information. For the examples discussed herein, the controller either performs a reselection procedure for dynamically updated information or a reselection procedure for non-dynamically updated information. If the indicator 122 indicates that the MBMS SAI frequency information 121 is updated dynamically, the controller reselects the identified frequency and prioritizes the frequency. More specifically, the controller performs the appropriate functions to tune the receiver to the particular MBMS frequency channel and decode the MCCH. The MCCH information is transmitted periodically, using a configurable repetition period. Scheduling information is not provided for MCCH (i.e., both the time domain scheduling as well as the lower layer configuration are semi-statically configured in System Information Block 13 or SIB13). The MCCH provides the MBMS control information for the wireless communication device to determine if services it is interested to receive are ongoing. More specifically, the MCCH carries the MBSFNAreaConfiguration message, which indicates the MBMS sessions that are ongoing as well as the corresponding radio resource configuration. The MCCH may also carry the MBMSCountingRequest message, when the network is to count the number of UEs in RRC_CONNECTED mode that are receiving or interested to receive one or more specific MBMS services. Change of MCCH information only occurs at specific radio frames (i.e., the concept of a modification period is used). Within a modification period, the same MCCH information may be transmitted a number of times. When the network changes some of the MCCH information, it notifies the wireless communication devices about the change during a first modification period. In the next modification period, the network transmits the updated MCCH information.

Upon receiving a change notification, a wireless communication device interested to receive MBMS services acquires the new MCCH information immediately from the start of the next modification period. Since the MCCH can only change at modification boundaries, the wireless communication device does not need to monitor each MCCH transmission, but only at the boundary of the new modification period.

If the indicator indicates that the MBMS frequency information is not dynamically updated, the controller 218 invokes a non-dynamic frequency reselection procedure. Depending on the particular implementation, the non-dynamic frequency reselection procedure may require a predetermined action or may include a procedure for the controller to determine the preferred action. For the examples discussed herein, the controller attempts to access the MBMS frequency channel and if the MBMS service is available, accesses the MBMS service. In some situations the MCCH may not include the information for accessing the MBMS service thereby indicating that the MBMS service is not currently available on the particular MBMS frequency. Different actions can be taken based on the particular implementation if the MBMS service is not available. For the three examples discussed immediately below, the controller 218 tunes to the MBMS frequency and attempts to acquire the MBMS service. More specifically, the controller performs the appropriate functions to tune the receiver to the particular MBMS frequency channel and decodes the MCCH. If the MCCH indicates the desired MBMS service is available, the controller applies the timing information provided in the MCCH to access the MBMS service. If, however, the MCCH does not indicate the MBMS service is available, the controller performs one of the following exemplary procedures.

In a first example of a non-dynamic frequency reselection procedure, the controller controls the wireless communication device to remain on the MBMS frequency and attempt to access the MBMS service by periodically decoding the MCCH. This procedure differs from conventional techniques in that the controller may invoke a lower frequency of MCCH decoding as compared to conventional systems. Such a procedure leads to reduced power consumption since the required power for decoding the MCCH is not insignificant. As a result, the controller can utilize the indicator to modify prioritization procedure even though the wireless communication device "camps" on the MBMS frequency.

In a second example of a non-dynamic frequency reselection procedure, the controller executes a procedure to tune to the frequency channel prioritized by the core network. Accordingly, the wireless communication device refrains from applying the exception for prioritizing the MBMS frequency channel for the desired MBMS service and operates in accordance with the core network prioritization list. In many circumstances, the prioritized frequency channel is the original frequency channel in use before the attempt to acquire the desired MBMS service. The reselection procedure is the same as the reselection procedure applied when the wireless communication device is no longer interested in MBMS.

In some situations, the non-dynamic frequency reselection procedure includes the controller dynamically determining the course of action when it is determined that the MBMS service is not currently available. Any combination of data, parameters, information, and criteria can be applied by the controller, within the bounds of the standards requirements, to determine an appropriate course of action for the wireless communication device. In a third example, the controller determines whether the user is interested in a second MBMS service if the first MBMS service is not available. If there is interest in a second MBMS service, the controller executes a procedure to acquire the second MBMS service. If there is no interest in another MBMS service and the first MBMS service is not available, the controller applies the core network prioritization as discussed in the second example.

In some situations, the controller may attempt to acquire the first MBMS service after an elapsed time after applying the network prioritization. For example, the wireless communication device may return to the original frequency if the MBMS service is not available, wait a predetermined time, and then again attempt to acquire the MBMS service by tuning the MBMS service frequency. In other examples, the controller may attempt to access another MBMS frequency listed as carrying the first desired MBMS service.

Figure 3:
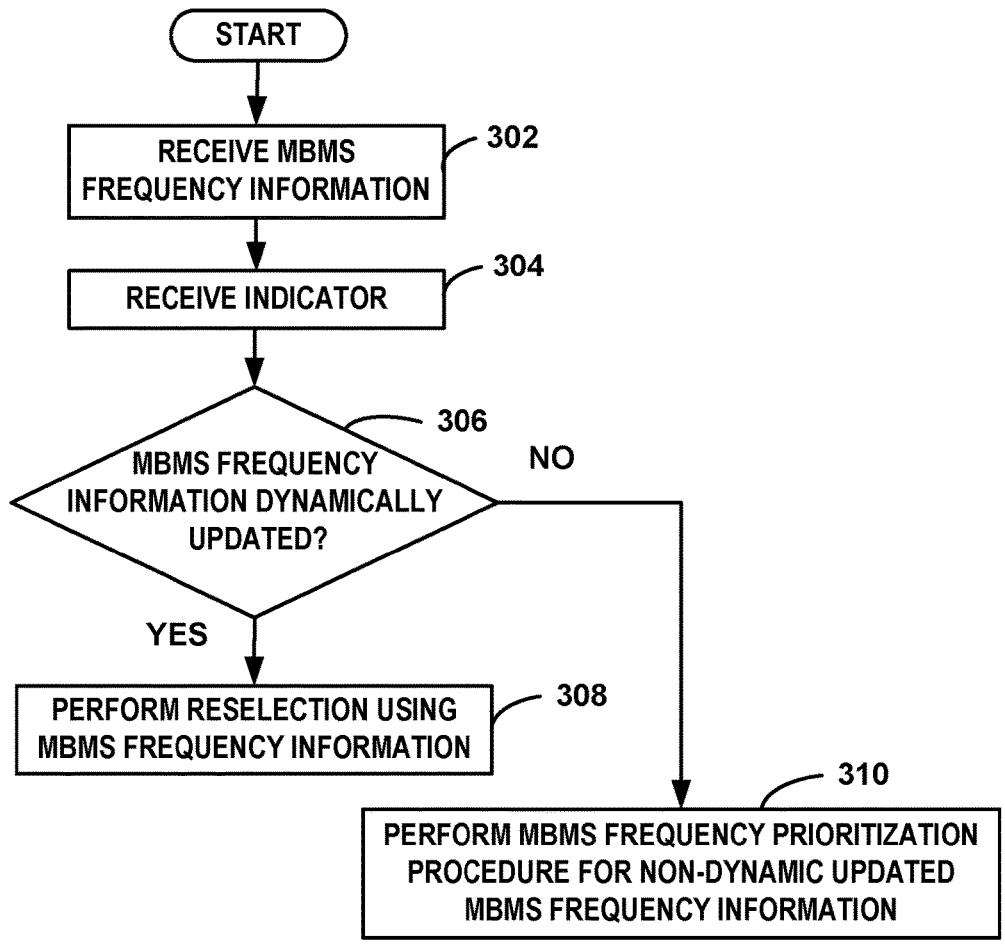
FIG. 3 is flowchart of a method performed in a wireless communication device (UE) such as the wireless communication device.

FIG. 3 is flowchart of a method performed in a wireless communication device (UE) such as the wireless communication device 212. For this example, the method begins with the wireless communication device 212 in the idle mode. The method can be modified in order to be applied to wireless communication devices in connected mode.

At step 302, MBMS SAI frequency information 121 is received at the wireless communication device. As discussed above, the MBMS SAI frequency information 121 is the information indicating to the wireless communication device the relationship between SAIs and frequencies. This information is used by the wireless communication device 212 to determine the MBMS frequency information 120 which provides the relationship between MBMS services and the MBMS frequency channels (MBMS service frequencies).

At step 304, the indicator 122 is received. For the example, the indicator 122 is transmitted in the SIB15 as a one-bit flag. A true indicator indicates that the MBMS SAI frequency information is dynamically updated and a false indicator indicates that the MBMS SAI frequency information is not dynamically updated. The indicator 122, therefore, indicates to the wireless communication devices (UEs) 102, 204, 206 whether the MBMS SAI frequency information is being updated after every occurrence of a network change that results in a change in the MBMS SAI frequency information.

At step 306, it is determined whether the MBMS frequency information is dynamically updated. The controller in the wireless communication device decodes the SIB15 and determines the value of the indicator 122. Based on the indicator value, the controller determines whether the MBMS frequency information is dynamically updated. If it is dynamically updated, the method continues at step 308. Otherwise, the method continues at step 310.

At step 308, a reselection procedure using the MBMS frequency information is performed. Data obtained from the USD 202 provides the relationship between TMGI 206 and the MBMS SAIs 208 and the data in the MBMS SAI frequency information 210 of the SIB15 provides the relationship between the frequency channels and the MBMS SAIs. By combining the data from the USD and the SIB15, the wireless communication device 212 determines the relationship between the MBMS service (TMGI) and the frequency channels. The wireless communication device tunes to the MBMS frequency channel identified by the MBMS frequency information as carrying the desired MBMS service. The wireless communication device decodes the MCCH and applies the MCCH information to acquire the MBMS service.

At step 310, an MBMS frequency prioritization procedure for non-dynamically updated MBMS frequency information is performed. This non-dynamic frequency prioritization procedure may be a dynamic operation where the wireless communication device evaluates information and determines the appropriate course of action or it may be a predetermined operation required by the system without evaluation by the wireless communication device. Examples of methods of MBMS frequency prioritization procedures for non-dynamically updated MBMS frequency information are discussed below with reference to FIG. 4, FIG. 5, and FIG. 6.

Figure 4:
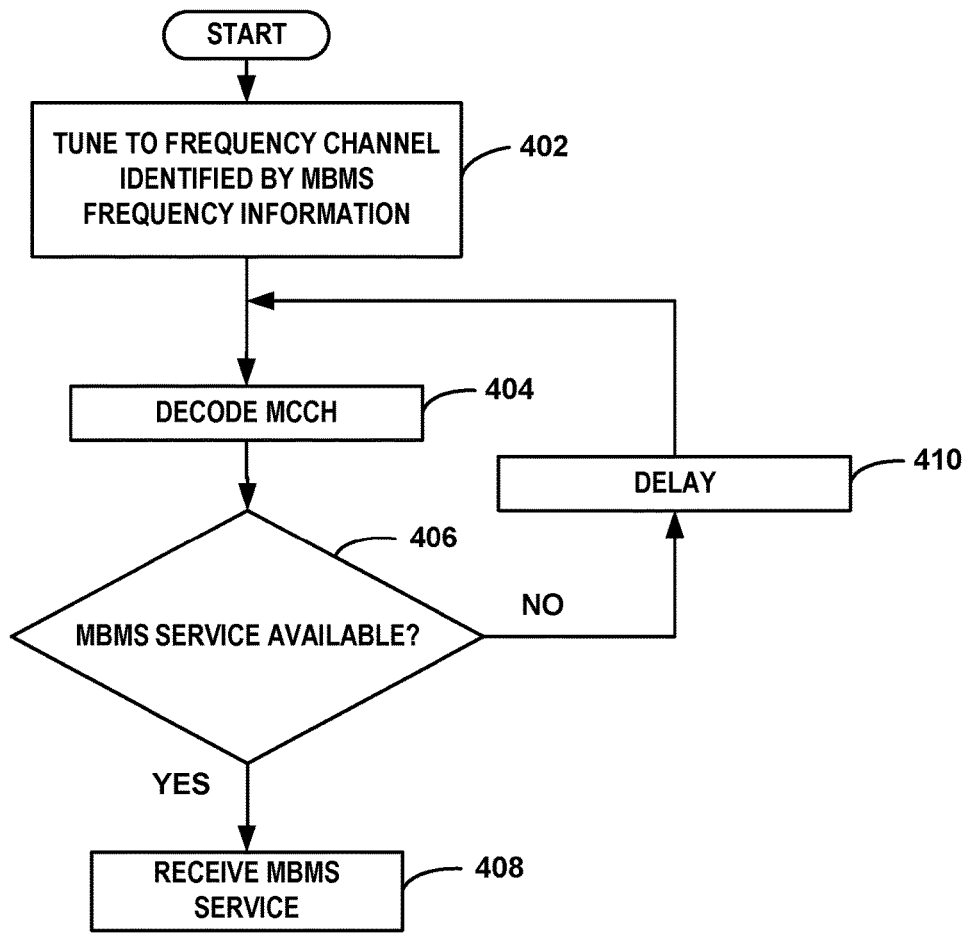
FIG. 4 is a flowchart of a first example of a method of an MBMS frequency prioritization procedure for non-dynamically updated MBMS frequency information.

FIG. 4 is a flowchart of a first example of a method of an MBMS frequency prioritization procedure for non-dynamically updated MBMS frequency information. Accordingly, the method discussed with reference to FIG. 4 is a first example of a method of performing step 310 of FIG. 3.

At step 402, the wireless communication device tunes to the MBMS frequency identified by the MBMS frequency information as providing the desired MBMS service. The controller applies the relationships between TMGI, MBMS SAIs, and frequency channels as provided by the USD and SIB15 to identify the MBMS frequency. The receiver is tuned to the MBMS frequency.

At step 404, the MCCH is decoded. In accordance with known techniques, the MCCH is received and decoded.

At step 406, it is determined whether the desired MBMS service is available at the MBMS frequency. The MCCH information is evaluated to determine whether the MBMS service is available. If the MCCH provides the subframe, timing, and other information for receiving the MBMS service, the MBMS service is available and the method continues at step 406. Otherwise, the MBMS service is not available and the method proceeds to step 410.

At step 408, the desired MBMS frequency is received. At step 410, a delay is applied before the method returns to step 404 where the MCCH is decoded again. In some cases, the delay can be omitted.

Therefore, in the first example, the wireless communication device camps at the MBMS frequency even though the MBMS service is not available. The MBMS frequency is prioritized. The wireless communication device will no longer prioritize the MBMS frequency when the user is no longer interested in the MBMS service. The MCCH is repeatedly decoded at every new modification period until the service becomes available or other action is required.

The frequency of the decoding may be less than a conventional system since the indicator indicates that the MBMS frequency information may not be reliable.

Figure 5:
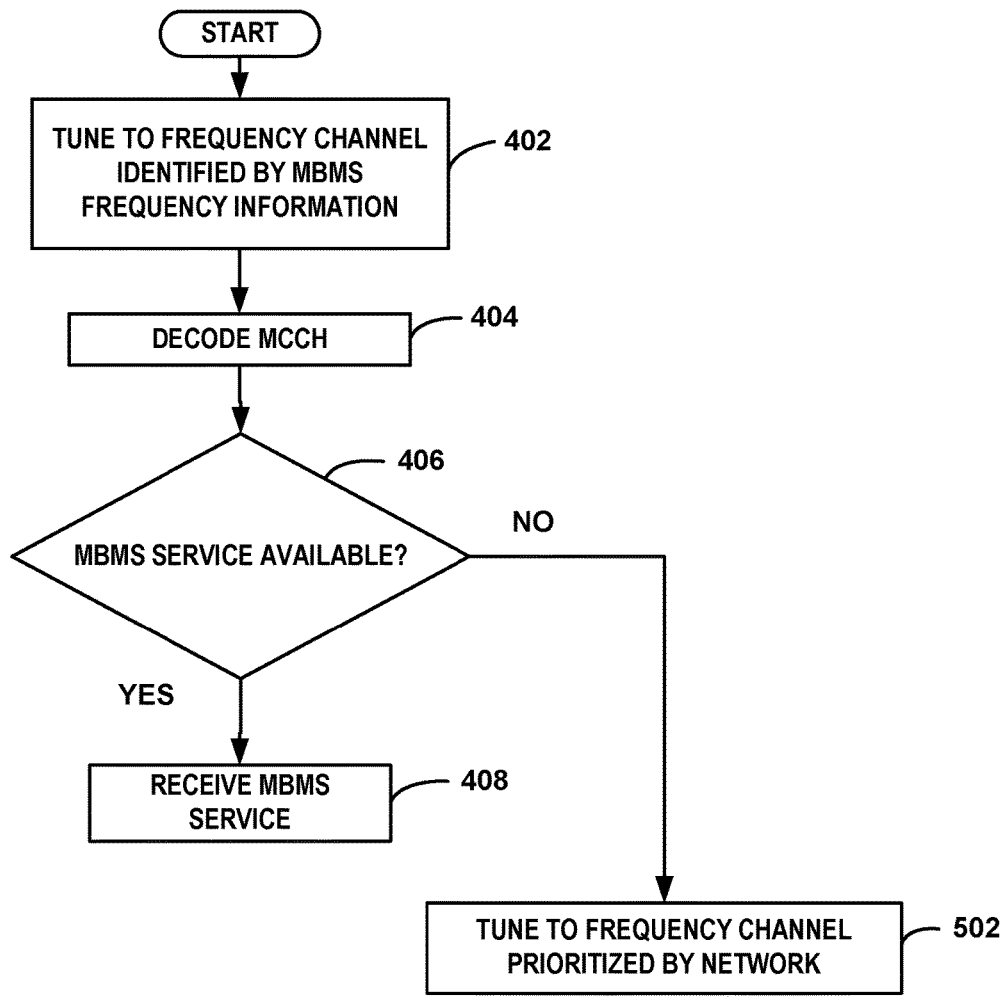
FIG. 5 is a flowchart of a second example of a method of an MBMS frequency prioritization procedure for non-dynamically updated MBMS frequency information.

FIG. 5 is a flowchart of a second example of a method of an MBMS frequency prioritization procedure for non-dynamically updated MBMS frequency information. Accordingly, the method discussed with reference to FIG. 5 is a second example of method of performing step 310 of FIG. 3. Steps 402, 404, 406, and 408 are executed as discussed above with reference to FIG. 4.

For the method of FIG. 5, the wireless communication device does not remain at the MBMS frequency when the MBMS service is not available as discussed with reference to FIG. 4. If it is determined that the MBMS service is not available at step 406, the method continues to step 502, wherein the wireless communication device tunes to the frequency dictated by the network prioritization. The frequency may be another MBMS frequency identified as providing the desired MBMS service, the original frequency before the wireless communication device attempted the reselection, or another frequency determined by the frequency reselection priority set forth by the network. The wireless communication device tunes to a new frequency and no longer prioritizes the MBMS service frequency if the MBMS service is not available at the MBMS service frequency.

Figure 6:
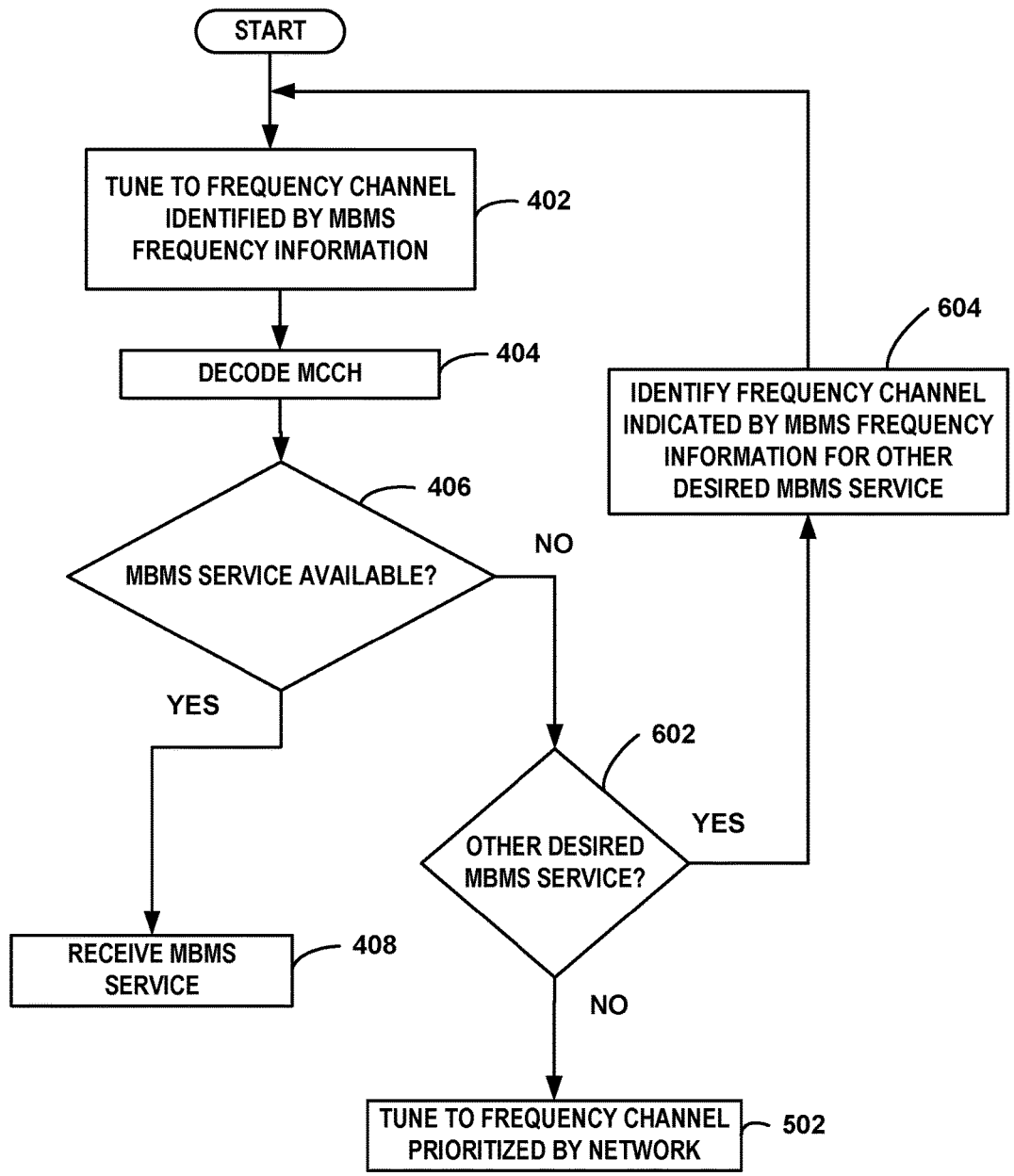
FIG. 6 is a flowchart of a third example of a method of an MBMS frequency prioritization procedure for non-dynamically updated MBMS frequency information.

FIG. 6 is a flowchart of a third example of a method of an MBMS frequency prioritization procedure for non-dynamically updated MBMS frequency information. Accordingly, the method discussed with reference to FIG. 6 is a third example of method of performing step 310 of FIG. 3. Steps 402, 404, 406, 408, and 502 are executed as discussed above with reference to FIG. 4.

For the method of FIG. 6, the wireless communication device does not remain at the MBMS frequency when the MBMS service is not available in the example discussed with reference to FIG. 5. For the example of FIG. 6, however, the wireless communication device only tunes to the frequency dictated by the network prioritization list if the first MBMS service is not available and the user is not interested in any other MBMS service. If it is determined that the first selected MBMS service is not available at step 406, the method continues to step 602, where the wireless communication device determines whether there is interest in a second MBMS service. If there is no interest in any other MBMS service, the method continues at step 502 where the wireless communication device applies the network prioritization. Otherwise, the method continues to step 604 before proceeding to step 402. At step 604, the wireless communication device determines the MBMS service frequency of the second MBMS service based on the MBMS SAI frequency information 121.

Figure 7:
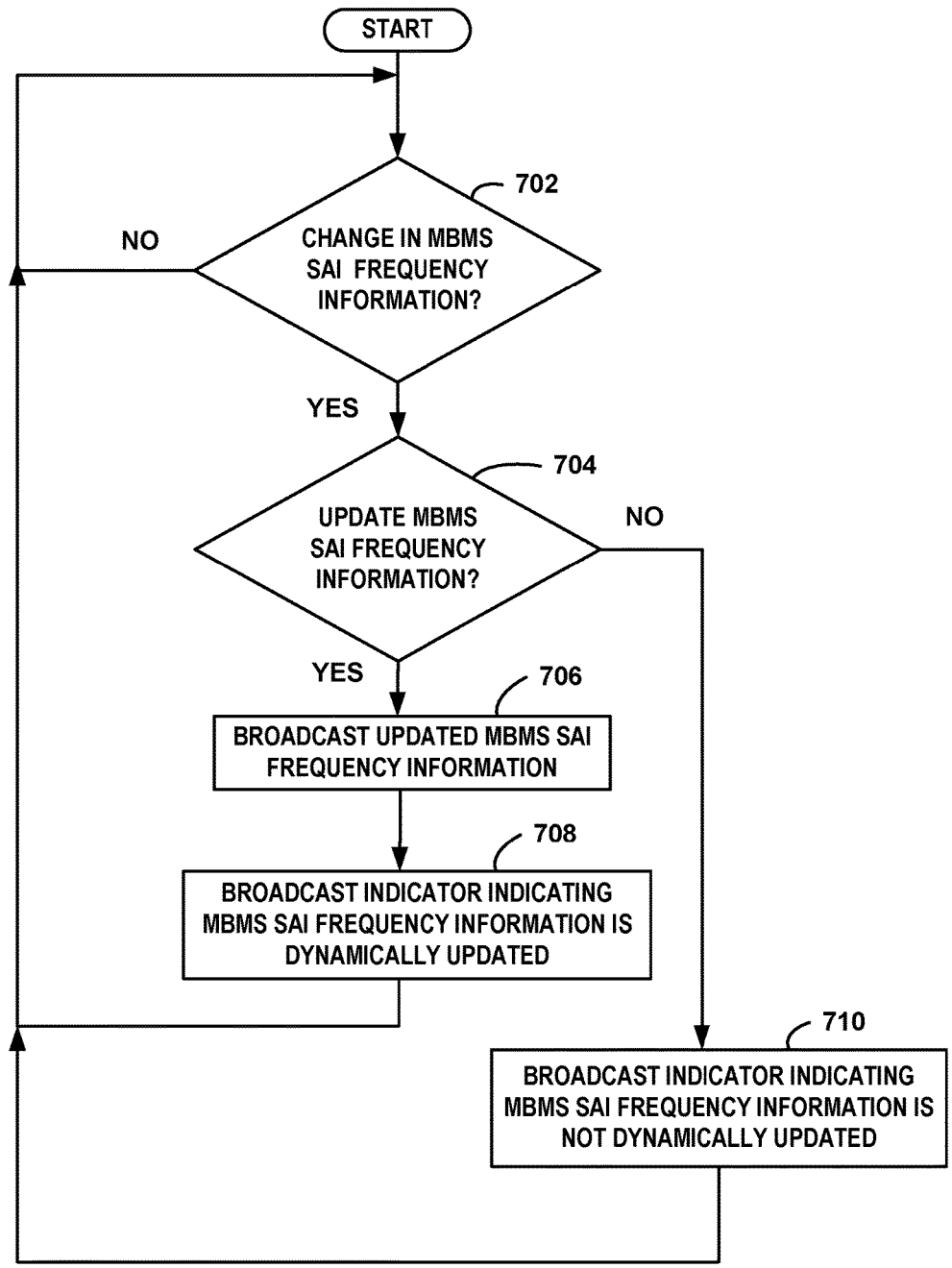
FIG. 7 is a flowchart of a method performed in a MBMS communication system such as the communication system.

FIG. 7 is a flowchart of a method performed in a MBMS communication system such as the communication system 100. The method described with reference to FIG. 7 is an example of a technique for broadcasting an indicator indicating to wireless communication devices whether MBMS frequency information provided by the system 100 is updated dynamically.

At step 702, it is determined whether the MBMS frequency information has changed. The system determines whether the MBMS SAI frequency information 121 listed in the most recent transmission is accurate or if changes within the system have resulted in a change of at least one MBMS frequency. In other words, a change has been determined to have occurred if a frequency channel is newly associated with a MBMS SAI or if a frequency channel previously associated with a MBMS SAI is no longer associated with the MBMS SAI. If a change has occurred, the method continues at step 704. Otherwise, the method remains at step 702 monitoring the MBMS frequency information for a change.

At step 704, it is determined whether the MBMS frequency information should be updated. In most situations, the system will determine to update the frequency information. If, however, circumstances dictate that new frequency information cannot be broadcasted at the present time, the determination is that the frequency information is not to be updated. If the frequency information is to be updated, the method continues at step 706. Otherwise, the method proceeds to step 710.

At step 706, the updated frequency information 120 is broadcasted. In the examples discussed herein, the data in the MBMS SAI frequency information 210 in the SIB15 is changed to reflect the current relationship between SAI and frequency channel.

At step 708, the indicator indicating that the MBMS frequency information 121 is dynamically updated is broadcast. In the examples herein, the one-bit indicator 122 in the SIB15 is set to "true." The method then returns to step 702.

At step 710, the indicator indicating that the MBMS SAI frequency information 121 is not dynamically updated is broadcast. In the examples herein, the one-bit indicator 122 in the SIB15 is set to "false." The method then returns to step 702.

FIG. 7 provides one example for setting and broadcasting the indicator 122. In some situations, however, it is possible that the system 100 is required to broadcast the indicator but is not configured to dynamically update MBMS SAI frequency information. In such situations, the base station may permanently set the indicator 122 to false and not execute the procedure discussed with reference to FIG. 7.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method in a Multimedia Broadcast Multicast Service (MBMS) system comprising a plurality of base stations, the method comprising:
   broadcasting from a base station to a wireless communication device, MBMS Service Area Identifier (SAI) frequency information providing a relationship between MBMS SAIs and service frequencies; and
   providing, to the wireless communication device, an indicator indicating whether the MBMS SAI frequency information is being dynamically updated, the indicator comprising a one-bit flag having one of two values comprising:
      a true indicator indicating that the MBMS SAI frequency information is dynamically updated; and
      a false indicator indicating that the MBMS SAI frequency information is not dynamically updated.

2. The method of claim 1, wherein the MBMS system is a 3rd Generation Partnership Project (3GPP) cellular network operating in accordance with a Long Term Evolution (LTE) communication specification.

3. The method of claim 2, wherein the MBMS system operates in accordance with a Radio Resource Control (RRC) specification having a revision no earlier than RRC TS 36.331 version 11.2.0.

4. The method of claim 1, wherein the MBMS SAI frequency information comprises all MBMS service frequencies for the base station and all MBMS service frequencies for neighboring base stations.

5. The method of claim 1, wherein the indicator indicates whether the MBMS SAI frequency information is updated after occurrences of network changes resulting in a change to the MBMS SAI frequency information.

6. The method of claim 5, wherein the occurrences of network changes comprise a change to at least one service frequency for at least one MBMS service in response to a counting procedure.

7. The method of claim 5, wherein the occurrences of network changes comprise a change to at least one service frequency for at least one MBMS service in response to adjustments to reduce network congestion.

8. The method of claim 5, wherein the occurrences of network changes comprise a change to at least one service frequency for at least one MBMS service in response to load balancing.

9. The method of claim 1, wherein the broadcasting the MBMS SAI frequency information comprises:
   broadcasting the MBMS SAI frequency information in a System Information Block Type 15 (SIB15).

10. The method of claim 1, wherein providing the indicator comprises broadcasting a system information message comprising system information indicative of the indicator.

11. The method of claim 10, wherein providing the indicator comprises broadcasting a System Information Block Type 15 (SIB15) comprising the system information indicative of the indicator.

12. A method in a wireless communication device operating in a Multimedia Broadcast Multicast Service (MBMS) system comprising a plurality of base stations, the method comprising:
   receiving, at the wireless communication device, MBMS Service Area Identifier (SAI) frequency information providing a relationship between MBMS SAIs and service frequencies;
   receiving an indicator indicating to the wireless communication device whether the MBMS SAI frequency information is being dynamically updated, the indicator comprising a one-bit flag having one of two values comprising:
      a true indicator indicating that the MBMS SAI frequency information is dynamically updated; and
      a false indicator indicating that the MBMS SAI frequency information is not dynamically updated.

13. The method of claim 12, wherein the indicator indicates whether the MBMS SAI frequency information is updated after occurrences of network changes resulting in a change to the MBMS SAI frequency information.

14. The method of claim 12, further comprising:
   determining MBMS frequency information correlating a desired MBMS service to at least one frequency.

15. The method of claim 14, wherein the determining the MBMS frequency information comprises evaluating User Service Description (USD) information and the MBMS SAI frequency information.

16. The method of claim 15, wherein the USD information comprises MBMS Service Area Identifiers (SAIs) and MBMS Temporary Mobile Group Identities (TMGIs) and association between at least TMGI and each of at least some of the MBMS SAIs.

17. The method of claim 12, wherein receiving the indicator comprises receiving the indicator in a broadcasted system information message comprising system information indicative of the indicator.

18. The method of claim 17, wherein receiving the indicator comprises receiving a System Information Block Type 15 (SIB15) comprising the system information indicative of the indicator.

19. The method of claim 12, further comprising:
    in response to receiving the true indicator, tuning to an identified MBMS service frequency identified by the MBMS frequency information as carrying the desired MBMS service, the tuning without decoding a Multicast Control Channel (MCCH) of an MBMS service frequency other than the identified MBMS service frequency.

20. The method of claim 12, further comprising:
    in response to receiving the false indicator, tuning to the identified MBMS service frequency identified by the MBMS frequency information as providing the desired MBMS service; and
    remaining on the identified MBMS service frequency if the desired MBMS service is not available at the identified MBMS service frequency.

21. The method of claim 12, further comprising:
    in response to receiving the false indicator, tuning to the identified MBMS service frequency identified by the MBMS frequency information as providing the desired MBMS service; and
    tuning to another frequency in accordance with a network prioritization if the desired MBMS service is not available at the identified MBMS service frequency.

22. The method of claim 12, further comprising:
    in response to receiving the false indicator, tuning to the identified MBMS service frequency identified by the MBMS frequency information as providing the desired MBMS service;
    tuning to another identified MBMS service frequency identified for another MBMS service if there is interest in the another MBMS service and the desired MBMS service is not available at the identified MBMS service frequency; and
    tuning to another frequency in accordance with a network prioritization if the desired MBMS service is not available at the identified MBMS service frequency and there is no interest in another MBMS service.

* * * * *